United States Patent
Yeh

(10) Patent No.: US 7,825,624 B2
(45) Date of Patent: Nov. 2, 2010

(54) BATTERY-OPERATED POWER OUTPUT DEVICE

(76) Inventor: Yi-Jang Yeh, No. 78, Yu-Wen 1st St., Tainan City (TW)

( * ) Notice: Subject to any disclaimer, the term of this patent is extended or adjusted under 35 U.S.C. 154(b) by 763 days.

(21) Appl. No.: 11/830,061

(22) Filed: Jul. 30, 2007

(65) Prior Publication Data

US 2008/0224653 A1    Sep. 18, 2008

(30) Foreign Application Priority Data

Mar. 12, 2007    (TW) .............................. 96108388 A

(51) Int. Cl.
*H02J 7/00* (2006.01)
(52) U.S. Cl. ...................... 320/103; 320/152
(58) Field of Classification Search ................. 320/103, 320/152, 158
See application file for complete search history.

(56) References Cited

U.S. PATENT DOCUMENTS

| | | | | |
|---|---|---|---|---|
| 5,686,811 A | * | 11/1997 | Bushong et al. ............. | 320/110 |
| 6,441,589 B1 | * | 8/2002 | Frerking et al. ............. | 320/162 |
| 6,528,969 B2 | * | 3/2003 | Tung et al. .................. | 320/103 |
| 7,079,893 B2 | * | 7/2006 | Greatbatch et al. ............. | 607/5 |
| 7,511,451 B2 | * | 3/2009 | Pierce ......................... | 320/103 |
| 2006/0103344 A1 | * | 5/2006 | Hassan et al. ............... | 320/103 |

* cited by examiner

*Primary Examiner*—Edward Tso
*Assistant Examiner*—Samuel Berhanu
(74) *Attorney, Agent, or Firm*—Fox Rothschild, LLP; Robert J. Sacco

(57) ABSTRACT

A battery-operated power output device includes a battery seat for receiving a dry cell power source, a charging signal generator connected to the battery seat for generating a charging signal output, a power source connector for connection to a rechargeable battery load, a safety switch for making or breaking connection between the power source connector and the charging signal generator, a detecting module for detecting voltage and current values of the charging signal output, and a switch controller that controls the safety switch according to a timer signal from a timer unit and detected voltage and current values from the detecting module.

8 Claims, 2 Drawing Sheets

BATTERY-OPERATED POWER OUTPUT DEVICE

CROSS-REFERENCE TO RELATED APPLICATION

This application claims priority of Taiwanese application no. 096108388, filed on Mar. 12, 2007.

BACKGROUND OF THE INVENTION

1. Field of the Invention

The invention relates to a power output device, more particularly to a battery-operated power output device.

2. Description of the Related Art

Portable electronic products, such as portable computers, mobile phones, MP3 players, digital cameras, etc., generally rely on rechargeable batteries as a source of power. Rechargeable batteries are usually charged using a commercial AC power source through a transformer. In the case of a portable computer, an internal rechargeable battery thereof permits normal use of the portable computer for two to three hours. When the portable computer is used in an environment where the commercial AC power source is not available, such as when the user is outdoors or is riding an airplane or train, the portable computer cannot be used in the event that the rechargeable battery thereof runs out of power. There is thus a need in the art to provide a device that can charge a rechargeable battery using standard AA or AAA dry battery cells as a power source to overcome the above drawback.

SUMMARY OF THE INVENTION

Therefore, the object of the present invention is to provide a battery-operated power output device adapted for charging a rechargeable battery load using standard dry battery cells as a power source.

Accordingly, a battery-operated power output device of this invention is adapted for charging a rechargeable battery load using a dry cell power source. The battery-operated power output device comprises a battery seat, a charging signal generator, a power source connector, a safety switch, a detecting module, a timer unit, and a switch controller.

The battery seat is adapted for receiving the dry cell power source therein and for connecting electrically to the dry cell power source.

The charging signal generator is connected electrically to the battery seat and is operable to generate a charging signal output that can be varied to meet voltage requirement of the rechargeable battery load.

The power source connector is adapted for connecting electrically to the rechargeable battery load.

The safety switch is connected electrically to the power source connector and the charging signal generator, and is operable to make or break electrical connection between the power source connector and the charging signal generator.

The detecting module is connected electrically to the charging signal generator for detecting voltage and current values of the charging signal output.

The timer unit is operable to initiate a timer operation upon supply of the charging signal output from the charging signal generator to the power source connector via the safety switch.

The switch controller is connected electrically to the safety switch, the detecting module and the timer unit, receives a timer signal from the timer unit and detected voltage and current values from the detecting module, is operable to control the safety switch to break electrical connection between the power source connector and the charging signal generator at the end of a charging period, and is further operable to control the safety switch to break the electrical connection between the power source connector and the charging signal generator according to the detected voltage and current values from the detecting module upon occurrence of one of abnormal voltage and current conditions.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
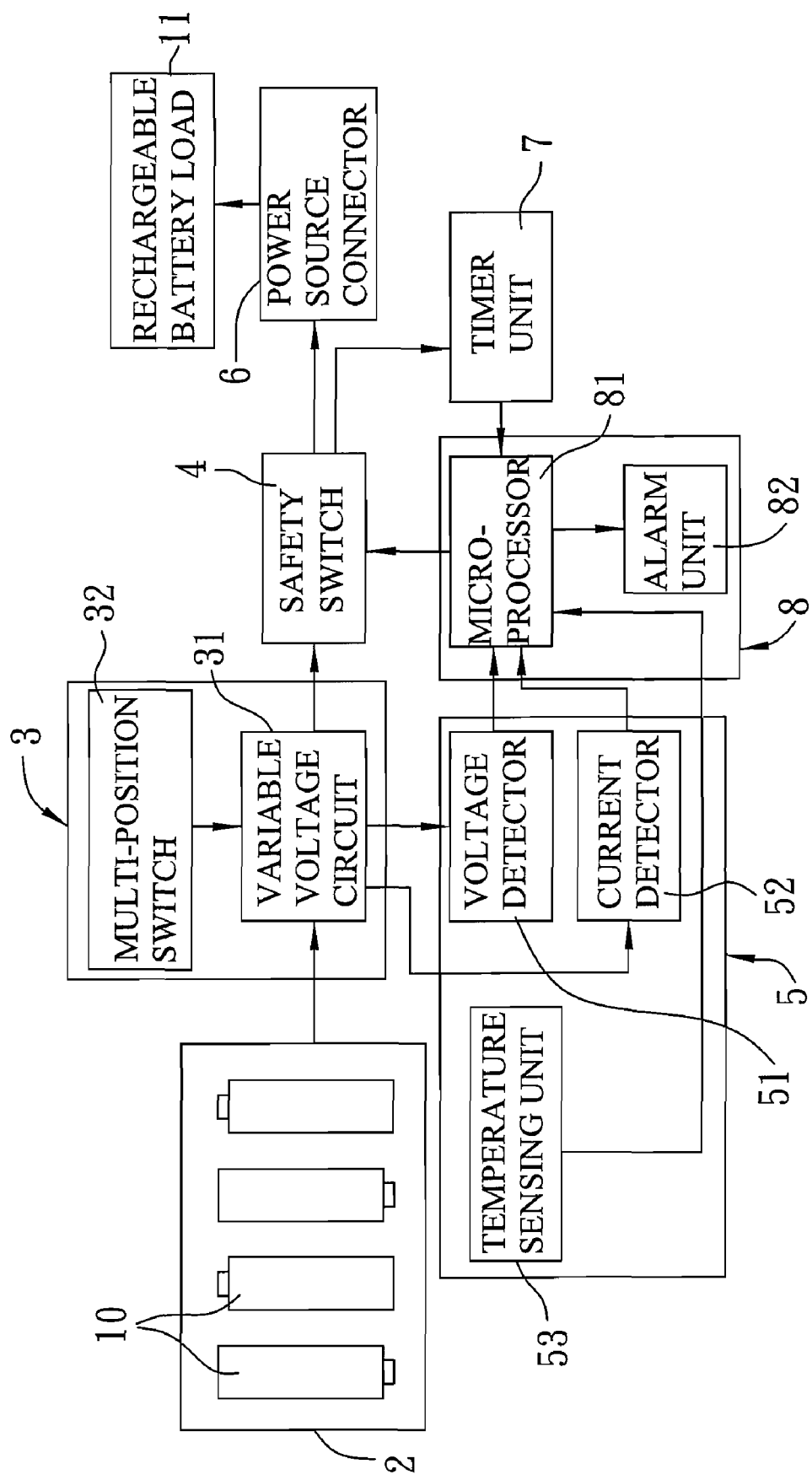
FIG. 1 is a schematic circuit block diagram of the preferred embodiment of a battery-operated power output device according to the present invention.

Referring to FIG. 1, the preferred embodiment of a battery-operated power output device according to the present invention is adapted for charging a rechargeable battery load 11 using a dry cell power source. The battery-operated power output device comprises a battery seat 2, a charging signal generator 3, a power source connector 6, a safety switch 4, a detecting module 5, a timer unit 7, and a switch controller 8.

The battery seat 2 is adapted for receiving the dry cell power source therein and for connecting electrically to the dry cell power source. The dry cell power source includes a plurality of standard dry battery cells 10, such as AA or AAA dry battery cells, which may or may not be rechargeable, such as lithium cells, alkaline cells, etc. The battery seat 2 interconnects electrically in series the dry battery cells 10 of the dry cell power source received therein. In this embodiment, the dry cell power source is exemplified using four dry battery cells 10, which are AA rechargeable manganese alkaline cells, each of which has a battery voltage of about 1.5 volts. In practice, the number of the dry battery cells 10 that can be used to form the dry cell power source may be varied to meet actual design requirements.

The charging signal generator 3 is connected electrically to the battery seat 2 and is operable to generate a charging signal output that can be varied to meet voltage requirement of the rechargeable battery load 11. In this embodiment, the charging signal generator 3 may be disposed in the battery seat 2, and includes a variable voltage circuit 31 for generating the charging signal output from the series-connected dry battery cells 10 of the dry cell power source, and a multi-position switch 32 exposed from the battery seat 2, connected electrically to the variable voltage circuit 31, and operable to set the charging signal output of the variable voltage circuit 31. In particular, by disposing the multi-position switch 32 at a selected position, the variable voltage circuit 31 can be controlled such that the voltage value of the charging signal output thus generated corresponds to the selected position of the multi-position switch 32. The multi-position switch 32 may be a rotary type, a push button type or a lever type.

The power source connector 6 is adapted for connecting electrically to the rechargeable battery load 11.

The safety switch 4 is disposed in the battery seat 2, is connected electrically to the power source connector 6 and the charging signal generator 3, and is operable to make or break electrical connection between the power source connector 6 and the charging signal generator 3.

The detecting module 5 is disposed in the battery seat 2, is connected electrically to the variable voltage circuit 31 of the charging signal generator 3, and includes a voltage detector 51 and a current detector 52, each of which is connected electrically to the switch controller 8 and the charging signal generator 3, and each of which detects a respective one of voltage and current values of the charging signal output. The detecting module 5 further includes a temperature sensing unit 53 adapted for detecting temperature of the dry cell power source, connected electrically to the switch controller 8, and providing a detected temperature signal corresponding to the temperature detected thereby to the switch controller 8.

The timer unit 7 is disposed in the battery seat 2, is connected electrically to the safety switch 4, and is operable to initiate a timer operation upon supply of the charging signal output from the charging signal generator 3 to the power source connector 6 via the safety switch 4. In this embodiment, the timer unit 7 has information of a charging period set therein, and provides a timer signal at the end of the charging period. The charging period may be set to 60 minutes but should not be limited thereto. The charging period may be adjusted to suit the specification of the rechargeable battery load 11. In addition, the timer unit 7 stops the timer operation thereof when the safety switch 4 breaks the electrical connection between the power source connector 6 and the charging signal generator 3.

The switch controller 8 is disposed in the battery seat 2, and includes a microprocessor 81 and an alarm unit 82. The microprocessor 81 is connected electrically to the safety switch 4, the detecting module 5 and the timer unit 7, receives the timer signal from the timer unit 7 and the detected voltage and current values and the detected temperature signal from the detecting module 5, and controls the safety switch 4 in accordance with the timer signal, the detected voltage and current values, and the detected temperature signal received thereby. In particular, the microprocessor 81 has a current safety threshold, a reference voltage value for the charging signal output, and a temperature safety threshold of the dry cell power source set therein. The microprocessor 81 is operable to control the safety switch 4 to break electrical connection between the power source connector 6 and the charging signal generator 3 at the end of the charging period, to break the electrical connection between the power source connector 6 and the charging signal generator 3 according to the detected voltage and current values from the detecting module 5 upon occurrence of one of abnormal voltage and current conditions, and to break the electrical connection between the charging signal generator 3 and the power source connector 6 according to the detected temperature signal when the temperature of the dry cell power source exceeds the temperature safety threshold. The alarm unit 82 is exposed from the battery seat 2, and is connected electrically to and is controlled by the microprocessor 81 for generating an alarm output whenever charging of the rechargeable battery load 11 is interrupted.

The temperature safety threshold of the dry cell power source depends on the specification of the dry battery cells 10. In the case of AA manganese alkaline dry battery cells 10, a normal working temperature thereof is below 45° C., which can be chosen as the temperature safety threshold. On the other hand, the current safety threshold and the reference voltage value vary according to the specification of the rechargeable battery load 11.

Moreover, in this embodiment, the alarm unit 82 is driven by the microprocessor 81 to generate a visible alarm output.

In practice, the alarm output may be an audible alarm output or a combination of audible and visible signals.

Figure 2:
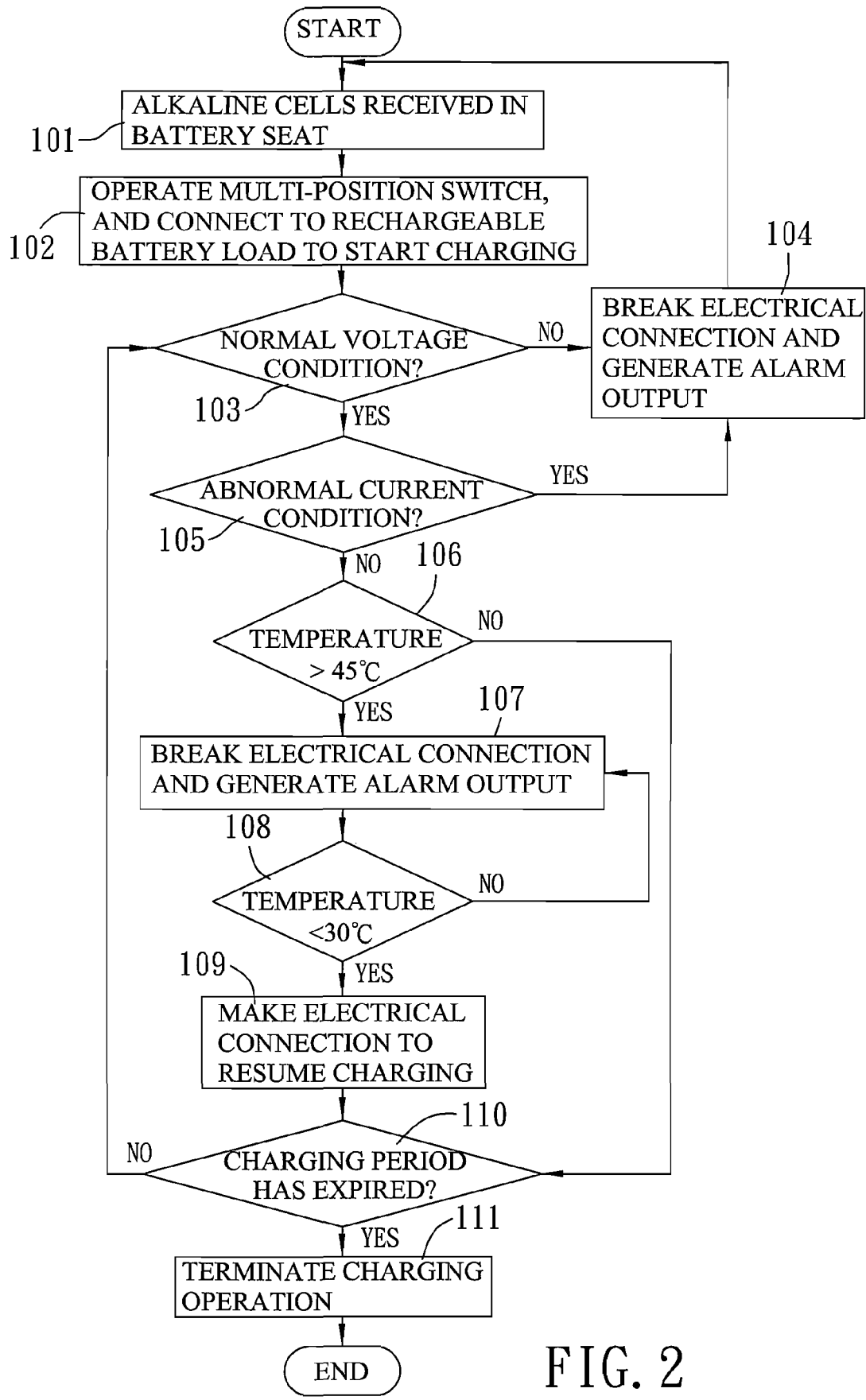
FIG. 2 is a flowchart to illustrate a charging operation of the preferred embodiment.

FIG. 2 is a flowchart to illustrate a charging operation performed by the battery-operated power output device of this invention.

Initially, in step 101, the dry battery cells 10 for charging the rechargeable battery load 11 are received in and are interconnected in series by the battery seat 2. Next, in step 102, the multi-position switch 32 is operated according to the specification of the rechargeable battery load 11 to set a charging voltage of the charging signal output of the variable voltage circuit 31, which should be equal to or slightly larger than the charging voltage requirement of the rechargeable battery load 11 but smaller than the reference voltage value preset in the switch controller 8. Then, the power source connector 6 is connected electrically to the rechargeable battery load 11. At this time, the safety switch 4 makes electrical connection between the variable voltage circuit 31 and the power source connector 6 such that the charging signal output with the selected charging voltage, which is generated by the variable voltage circuit 31 from electricity supplied by the dry cell power source, is supplied to the rechargeable battery load 11 via the safety switch 4 and the power source connector 6, thereby starting charging of the rechargeable battery load 11. The timer unit 7 initiates its timer operation upon supply of the charging signal output from the charging signal generator 4 to the power source connector 6 via the safety switch 5.

In this example, four manganese alkaline dry battery cells 10 are used to form the dry cell power source, the maximum charging voltage of the charging signal output is 6 volts, and the charging voltage requirement of the rechargeable battery load 11 is 4 volts. Hence, in this example, the multi-position switch 32 is operated to set the charging voltage of the charging signal output of the variable voltage circuit 31 to be larger than 4 volts, e.g., 4.5 volts. Likewise, when dry battery cells 10 of another specification are used in the dry cell power source, the multi-position switch 32 is operated to enable the variable voltage circuit 31 to generate the charging signal output with a charging voltage slightly larger than the voltage requirement of the rechargeable battery load 11 so that the latter can be charged effectively.

Thereafter, in step 103, the voltage detector 51 of the detecting module 5 detects the voltage value of the charging signal output from the variable voltage circuit 31, and the microprocessor 81 determines the presence of an abnormal voltage condition with reference to the reference voltage value preset therein. In case of an abnormal voltage condition, i.e., the detected voltage value is larger than the reference voltage value, the flow proceeds to step 104, where the microprocessor 81 controls the safety switch 4 to break the electrical connection between the power source connector 6 and the charging signal generator 3, and further controls the alarm unit 82 to generate the alarm output. In the meantime, the timer unit 7 will stop the timer operation thereof, and the flow goes back to step 101. The user can examine the dry battery cells 10 at this time to find the cause of voltage abnormality, such as use of dry battery cells of improper specification. On the other hand, if the abnormal voltage condition is not found, the flow goes to step 105.

In step 105, the current detector 52 of the detecting module 5 detects the current value of the charging signal output from the variable voltage circuit 31, and the microprocessor 81 determines the presence of an abnormal current condition with reference to the current safety threshold preset therein. In case of an abnormal current condition, i.e., the detected current value is larger than the current safety threshold, the flow proceeds to step 104. On the other hand, if the abnormal current condition is not found, the flow goes to step 106. In step 106, the temperature sensing unit 53 of the detecting module 5 detects the temperature of the dry cell power source, and provides the detected temperature signal corresponding to the temperature detected thereby to the microprocessor 81. If the microprocessor 81 determines from the detected temperature signal that the temperature of the dry cell power source does not exceed the temperature safety threshold, which is 45° C. in this embodiment, the flow goes to step 110. Otherwise, the flow goes to the step 107.

In step 107, the microprocessor 81 controls the safety switch 4 to break the electrical connection between the variable voltage circuit 31 and the power source connector 6 so as to stop charging of the rechargeable battery load 11, and controls the alarm unit 82 to generate the alarm output. The timer unit 7 stops the timer operation thereof at this time.

Subsequently, in step 108, the microprocessor 81 determines from the detected temperature signal provided by the temperature sensing unit 53 if the temperature of the dry cell power source has fallen below a low temperature threshold, which is 30° C. in this embodiment. If negative, the flow goes back step 107. Otherwise, the flow goes to step 109. In step 109, the microprocessor 81 controls the safety switch 4 to make electrical connection between the variable voltage circuit 31 and the power source connector 6 so as to resume charging of the rechargeable battery load 11. The timer unit 7 initiates a new timer operation at this time.

In practice, the actual values of the temperature safety threshold and the low temperature threshold may vary depending on the type of the dry battery cells 10 and should not be limited to those described above.

In step 110, the microprocessor 81 determines from the timer signal of the timer unit 7 if the charging period has expired. If yes, the flow goes to step 111, where the microprocessor 81 controls the safety switch 4 to break the electrical connection between the power source connector 6 and the charging signal generator 3 to end the charging operation of the rechargeable battery load 11. Otherwise, the flow goes back to step 103.

It is noted that, while the charging signal generator 3 and the power source connector 6 are disposed on the battery seat 2 in this embodiment, it is possible to design them to be removably connected to the battery seat 2 in other embodiments of this invention. Moreover, in practice, the battery seat 2 may be specially designed for a specific dry cell power source such that the multi-position switch 32 is dispensable.

In sum, the battery-operated power output device of this invention is adapted for charging a rechargeable battery load 11 using a dry cell power source in case commercial AC power is not available. Moreover, through the variable voltage design of the charging signal generator 3, the power output device of this invention can be conveniently used with different specifications of the dry battery cells 10 for charging the rechargeable battery load 11.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A battery-operated power output device adapted for charging a rechargeable battery load using a dry cell power source, said battery-operated power output device comprising:

a battery seat adapted for receiving the dry cell power source therein and for connecting electrically to the dry cell power source;

a charging signal generator connected electrically to said battery seat and operable to generate a charging signal output that can be varied to meet voltage requirement of the rechargeable battery load;

a power source connector adapted for connecting electrically to the rechargeable battery load;

a safety switch connected electrically to said power source connector and said charging signal generator and operable to make or break electrical connection between said power source connector and said charging signal generator;

a detecting module connected electrically to said charging signal generator for detecting voltage and current values of the charging signal output;

a timer unit operable to initiate a timer operation upon supply of the charging signal output from said charging signal generator to said power source connector via said safety switch; and a switch controller connected electrically to said safety switch, said detecting module and said timer unit, receiving a timer signal from said timer unit and detected voltage and current values from said detecting module, operable to control said safety switch to break electrical connection between said power source connector and said charging signal generator at the end of a charging period, and further operable to control said safety switch to break the electrical connection between said power source connector and said charging signal generator according to the detected voltage and current values from said detecting module upon occurrence of one of abnormal voltage and current conditions.

2. The battery-operated power output device as claimed in claim 1, wherein said timer unit has the charging period set therein, and provides the timer signal to said switch controller at the end of the charging period.

3. The battery-operated power output device as claimed in claim 1, the dry cell power source including a plurality of dry battery cells, wherein said battery seat is adapted for interconnecting electrically in series the dry battery cells of the dry cell power source received therein, said charging signal generator including a variable voltage circuit for generating the charging signal output from the series-connected dry battery cells of the dry cell power source.

4. The battery-operated power output device as claimed in claim 3, wherein said charging signal generator further includes a multi-position switch connected electrically to said variable voltage circuit and operable to set the charging signal output of said variable voltage circuit.

5. The battery-operated power output device as claimed in claim 1, wherein said detecting module includes a voltage detector and a current detector, each of which is connected electrically to said switch controller and said charging signal generator.

6. The battery-operated power output device as claimed in claim 5, wherein said detecting module further includes a temperature sensing unit disposed on said battery seat, adapted for detecting temperature of the dry cell power source, connected electrically to said switch controller, and providing a detected temperature signal corresponding to the temperature detected thereby to said switch controller, said switch controller being further operable to control said safety switch to break the electrical connection between said charging signal generator and said power source connector according to the detected temperature signal when the temperature of the dry cell power source exceeds a safety threshold.

7. The battery-operated power output device as claimed in claim 6, wherein said switch controller includes a microprocessor for receiving the timer signal from said timer unit and the detected voltage and current values and the detected temperature signal from said detecting module, and for controlling said safety switch in accordance with the timer signal, the detected voltage and current values, and the detected temperature signal received thereby, and an alarm unit connected electrically to and controlled by said microprocessor for generating an alarm output.

8. The battery-operated power output device as claimed in claim 1, wherein said timer unit stops the timer operation thereof when said safety switch breaks the electrical connection between said charging signal generator and said power source connector.

* * * * *